(12) United States Patent
Lee (10) Patent No.: US 11,187,930 B2
(45) Date of Patent: Nov. 30, 2021

(54) LIQUID CRYSTAL DISPLAY DEVICE

(71) Applicant: LG Display Co., Ltd., Seoul (KR)

(72) Inventor: Woo-Bong Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/122,650

(22) Filed: Dec. 15, 2020

(65) Prior Publication Data
US 2021/0200017 A1    Jul. 1, 2021

(30) Foreign Application Priority Data
Dec. 30, 2019 (KR) .................. 10-2019-0177270

(51) Int. Cl.
*G02F 1/1333* (2006.01)
*F21V 8/00* (2006.01)
(52) U.S. Cl.
CPC ..... *G02F 1/133314* (2021.01); *G02B 6/0055* (2013.01); *G02F 1/13332* (2021.01); *G02F 2201/46* (2013.01); *G02F 2201/465* (2013.01)
(58) Field of Classification Search
None
See application file for complete search history.

(56) References Cited

U.S. PATENT DOCUMENTS

2009/0310288 A1* 12/2009 Lee .......................... H05K 5/02
361/679.01
2015/0181656 A1* 6/2015 Bang ................. G02F 1/133308
313/512

FOREIGN PATENT DOCUMENTS

| KR | 10-1285542 B1 | 7/2013 |
|---|---|---|
| KR | 10-2014-0076290 A | 6/2014 |
| KR | 10-2016-0084534 A | 7/2016 |

* cited by examiner

*Primary Examiner* — Richard H Kim
(74) *Attorney, Agent, or Firm* — Birch, Stewart, Kolasch & Birch, LLP (57) ABSTRACT

Discussed is a liquid crystal display device. The liquid crystal display device of the present disclosure comprises a liquid crystal panel, a backlight unit disposed under the liquid crystal panel and including a light guide plate and an optical sheet over the light guide plate, and a bottom frame including a horizontal surface and a side surface, wherein first and second fastening protrusions are provided at an outer surface of the side surface of the bottom frame.

13 Claims, 6 Drawing Sheets

LIQUID CRYSTAL DISPLAY DEVICE

CROSS-REFERENCE TO RELATED APPLICATIONS

This application claims the priority benefit of Korean Patent Application No. 10-2019-0177270 filed in the Republic of Korea on Dec. 30, 2019, the entire contents of which are hereby expressly incorporated by reference for all purposes as if fully set forth herein into the present application.

BACKGROUND OF THE DISCLOSURE

Field of the Disclosure

The present disclosure relates to a liquid crystal display (LCD) device. More particularly, the present disclosure relates to an LCD device including light weight, thin profile and a narrow bezel without an image quality degradation.

Discussion of the Related Art

Liquid crystal display (LCD) devices, which are widely used for TVs, monitors, and so on because of characteristics adequate to display moving images and their high contrast ratio, use optical anisotropy and polarization properties of liquid crystal molecules to display images.

The LCD device has a liquid crystal panel including two substrates and a liquid crystal layer therebetween. The alignment direction of the liquid crystal molecules can be controlled by application of an electric field across the liquid crystal molecules.

Since the liquid crystal panel does not include a light source, the LCD device has a light source providing light into the liquid crystal panel. For example, a backlight unit including the light source is disposed at a rear side of the liquid crystal panel.

The liquid crystal panel and the backlight unit are integrally modularized through various mechanical elements. Namely, the liquid crystal panel and the backlight unit are modularized by a side frame covering a side of the liquid crystal panel and the backlight unit and having a rectangular frame shape, a top frame covering a front side edge of the liquid crystal panel, and a bottom frame covering a rear side of the backlight unit.

On the other hand, recently, the application of such liquid crystal display devices is increased to desktop computer monitors and wall-mounted televisions as well as portable computers. Accordingly, an LCD device having a reduced weight and volume with a large display area is being developed.

In addition, an LCD device having a narrow bezel structure is also needed.

SUMMARY OF THE DISCLOSURE

Accordingly, the present disclosure is directed to a liquid crystal display (LCD) device that substantially obviates one or more of the problems due to limitations and disadvantages of the related art.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a liquid crystal display device comprises a liquid crystal panel; a backlight unit disposed under the liquid crystal panel and including a light guide plate and an optical sheet over the light guide plate; and a bottom frame including a horizontal surface and a side surface, wherein first and second fastening protrusions are provided at an outer surface of the side surface.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Advantages and technical features of the present disclosure, and methods for achieving the advantages and the technical features will be clarified with reference to embodiments described below in detail together with the accompanying drawings. However, the present disclosure is not limited to the embodiments disclosed below, but will be implemented in various different forms. The embodiments allow the disclosure of the present disclosure to be complete and the ordinary skilled in the art to fully understand. The present disclosure is only defined by the scope of the claims.

The shapes, sizes, ratios, angles, numbers, etc., disclosed in the drawings for describing the embodiments of the present invention are exemplary, and the present invention is not limited to the drawings. The same reference numerals refer to the same components throughout the specification. In addition, in the description of the present disclosure, when it is determined that detailed descriptions of related known technologies can unnecessarily obscure the subject matter of the present disclosure, detailed descriptions thereof will be omitted. When 'include', 'have', 'consist of', etc., are used in this specification, other parts can be added unless 'only' is used. When a component is expressed as a singular number, the plural number is included unless otherwise specified.

In interpreting the components, it is interpreted as including the error range even if there is no explicit description.

In the case of the description of the positional relationship, for example, when the positional relationship of two parts is described as 'on', 'over', 'under', 'at a side', etc., one or more other parts can be positioned between the two parts unless 'right', 'direct' or 'adjacent' is used.

In the case of a description of a time relationship, for example, 'after', 'following', 'next', 'before', etc., two steps can be non-sequential.

Each of features of the various embodiments of the present disclosure can be partially or wholly combined or mixed with each other, and technically various interlocking and driving is possible. Each of the embodiments can be independently implemented with respect to each other or can be implemented together in an association relationship.

Reference will now be made in detail to exemplary embodiments, examples of which are illustrated in the accompanying drawings.

Figure 1:
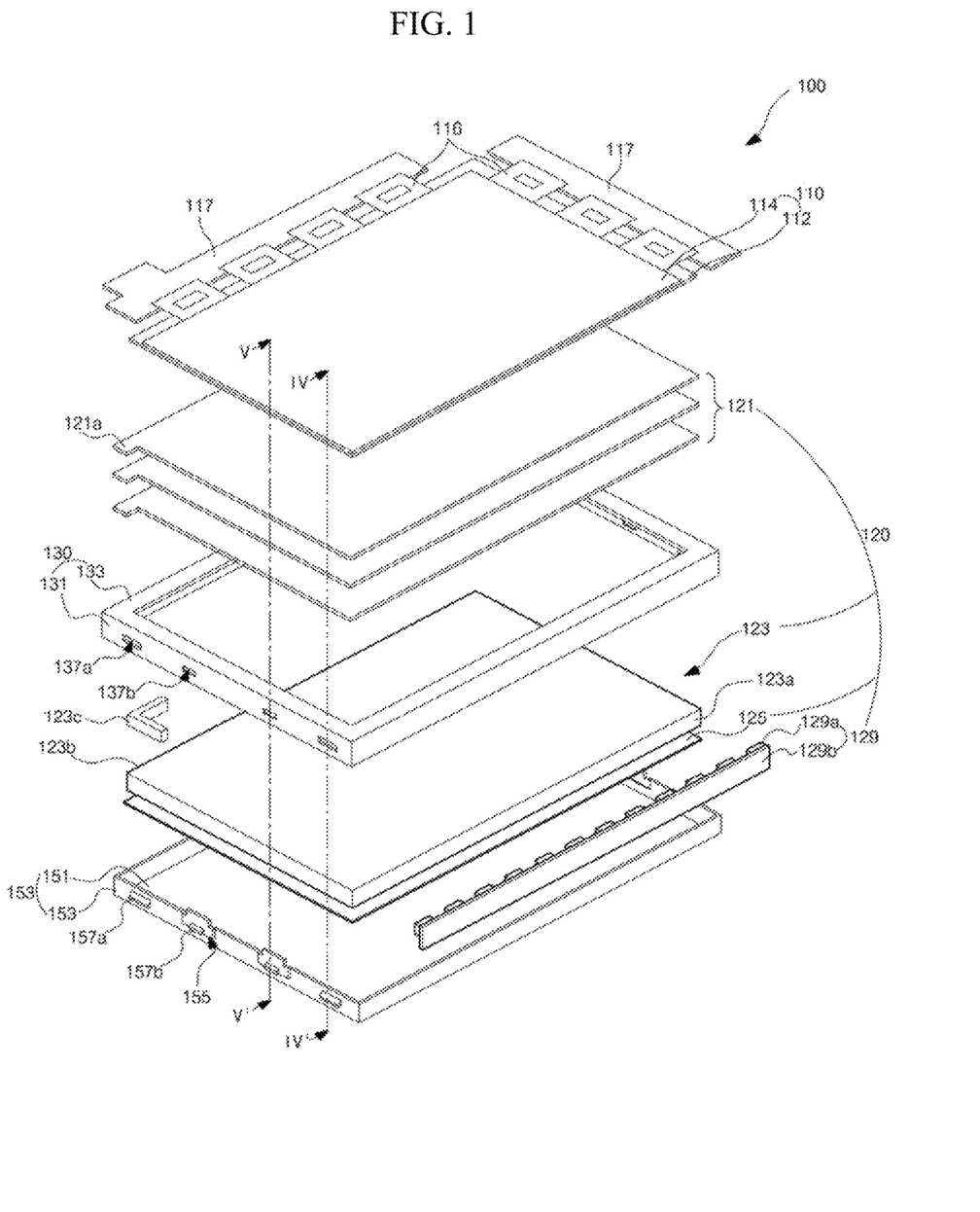
FIG. 1 is a schematic perspective view of an LCD device according to one or more embodiments of the present disclosure.

FIG. 1 is a schematic perspective view of an LCD device according to one or more embodiments of the present disclosure. All the components of the LCD device according to all embodiments of the present disclosure are operatively coupled and configured.

As shown in FIG. 1, an LCD device 100 includes a liquid crystal (LC) panel 110, a backlight unit 120, a main frame (e.g., a guide panel) 130 and a bottom frame 150. The main frame 130 can be referred to as a guide panel, and the bottom frame 150 can be referred to as a cover bottom or a bottom cover. Although the LC panel 110 having a rectangular shape is shown, the LC panel 110 and other associated elements can have different shapes and/or configurations.

The backlight unit 120 is disposed under the LC panel 110. Namely, the LC panel 110 has a display surface at a front side, and the backlight unit 120 is disposed at a rear side of the LC panel 110. The main frame 130 surrounds a side of each of the LC panel 110 and the backlight unit 120. The bottom frame 150 covers a rear side of the backlight unit 120. The main frame 130 and the bottom frame 150 are combined for modularization.

The LC panel 110 includes first and second substrates 112 and 114 facing each other and a liquid crystal layer therebetween.

For example, on the first substrate 112, a gate line, a data line, a thin film transistor (TFT) and a pixel electrode are formed. The gate and data lines cross each other to define a pixel region, and the TFT is formed at a crossing portion of the gate and data lines. The pixel electrode is disposed in the pixel region and connected to the TFT. The first substrate 112 can be referred to as a lower substrate or an array substrate.

On the second substrate 114, red, green and blue color filters, which correspond to respective pixel region, and a black matrix, which corresponds to the gate line, the data line and the TFT and surrounds the red, green and blue color filters, are formed. A transparent common electrode is formed to cover the red, green and blue color filters and the black matrix. The second substrate 114 can be referred to as an upper substrate or a color filter substrate.

In addition, first and second alignment layers for aligning an initial state of the liquid crystal molecules in the LC layer are formed on the first and second substrates 112 and 114, respectively. In addition, a seal pattern is formed at edges of the first and second substrates 112 and 114 for preventing leakage of the LC molecules.

Moreover, first and second polarizing plates 119a and 119b (of FIG. 4 for example) for selectively transmitting light are positioned on outer sides of the first and second substrates 112 and 114.

A printed circuit board (PCB) 117 is connected to a side of the LC panel 110 through a connection member, e.g., a flexible circuit board or a tape carrier package (TCP). The printed circuit board 117 is bent toward a rear surface of the bottom frame 150 in the modularization process.

When the TFT is turned on by the scanning signal from the gate line, the image signal is applied to the pixel electrode through the data line to produce an electric field between the pixel electrode and the common electrode. As a result, as the intensity or direction of the electric field is changed, the alignment of the LC molecules in the LC layer also changes such that light transmissivity is controlled.

To display images using the controlled transmissivity, the backlight unit 120 providing light toward the LC panel 110 is disposed at a rear side of the LC panel 110.

The backlight unit 120 can include an LED (light emitting diode) assembly 129 as a light source arranged along at least one side of the bottom frame 150, a reflective sheet 125, a light guide plate 123 on the reflective sheet 125 and an optical sheet 121 on or over the light guide plate 123.

The LED assembly 129 can be positioned at one side of the light guide plate 123 to face a light-incident surface of the light guide plate 123. The LED assembly can include a plurality of LEDs 129a and a printed circuit board (PCB) 129b where the LEDs 129a are disposed to be spaced apart from each other.

The LEDs 129a respectively emit red light, green light and blue light toward the light-incident surface of the light guide plate 123. The LEDs 129a are simultaneously turned on and off such that white light can be provided from the LEDs 129a by color mixture.

Alternatively, to improve the emitting efficiency and the brightness (luminance), an LED including a blue LED chip, which has excellent emitting efficiency and brightness, and a yellow fluorescent substance, e.g., cerium-doped yttrium-aluminum-garnet (YAG:Ce), can be used. A part of the blue light from the blue LED chip is converted into the yellow light, and the rest of the blue light and the yellow light are mixed. As a result, the LED 129a provides the blue light.

The light from the LEDs 129a is projected to the light guide plate 123 and refracted or reflected to be dispersed onto a wide region of the light guide plate 123. The light is processed into a plane light source by the light guide plate 123.

To provide an uniform plane light source, the light guide plate 123 can include patterns on a rear surface. For example, the pattern on the rear surface of the light guide plate 123 can be one of an elliptical pattern, a polygonal pattern and a hologram pattern. The patterns can be formed by a printing method or an injection molding method.

The reflective sheet 125 is disposed at a rear side of the light guide plate 123. Namely, the reflective sheet 125 is positioned between the light guide plate 123 and the bottom frame 150. The light passing through a rear surface of the light guide plate 123 is reflected on the reflective sheet such that the amount of light into the LC panel 110 is improved.

The optical sheet 121 on or over the light guide plate 123 can include a diffusion sheet and at least one light-concentration sheet. The light through the light guide plate 123 is diffused and/or concentrated by the optical sheet 121 such that a uniform plane light source can be provided onto the LC panel 110.

In an example, the optical sheet 121 has a rectangular shape and includes a protrusion 121a at a side being adjacent to the LED assembly 129. Namely, when the optical sheet 121 has a first side corresponding to the LED assembly 129 (or the light-incident surface of the light guide plate 123), a second side opposite to the first side, and third and fourth sides between the first and second sides, the protrusion 121a is positioned at the third side or the fourth side. The position of the optical sheet 121 is guided by the protrusion 121a, and the movement of the optical sheet 121 is prevented or minimized by the protrusion 121a.

In addition, a pad 123c can be further formed at a corner of an opposite side to the light-incident surface of the light guide plate 123 to prevent or minimize the movement of the light guide plate 123.

When the light guide plate 123 has a first surface 123a as the light-incident surface and a second surface 123b as being opposite to the first surface 123a, the pad 123c can have an "L" shape to cover a corner between the second surface 123b and an adjacent surface to the second surface 123b. The pad 123c is formed of an elastic material. The pad 123c is compressed and is inserted into a space between the light guide plate 123 and the bottom frame 150. The light guide plate 123 is pushed and fixed by an elastic force of the pad 123c such that the movement of the light guide plate 123 is prevented or minimized.

Since the pad 123c is made of a bright gray color, it is possible to prevent the darkening of the image at a corner of the second surface 123b of the light guide plate 123.

The liquid crystal panel 110 and the backlight unit 120 are combined using the main frame 130 and the bottom frame 150. The main frame 130 supports an edge of the liquid crystal panel 110 and surrounds a side of the backlight unit 120. The main frame 130 can have a rectangular ring shape. The main frame 130 includes a vertical portion 131 surrounding the side of the backlight unit 120 and a horizontal portion 133 extending from the vertical portion 131 toward a space between the liquid crystal panel 110 and the backlight unit 120.

The liquid crystal panel 110 is disposed on and fixed to the horizontal portion 133 using a foam pad 140 (of FIG. 4) such as a double-sided tape.

Figure 2:
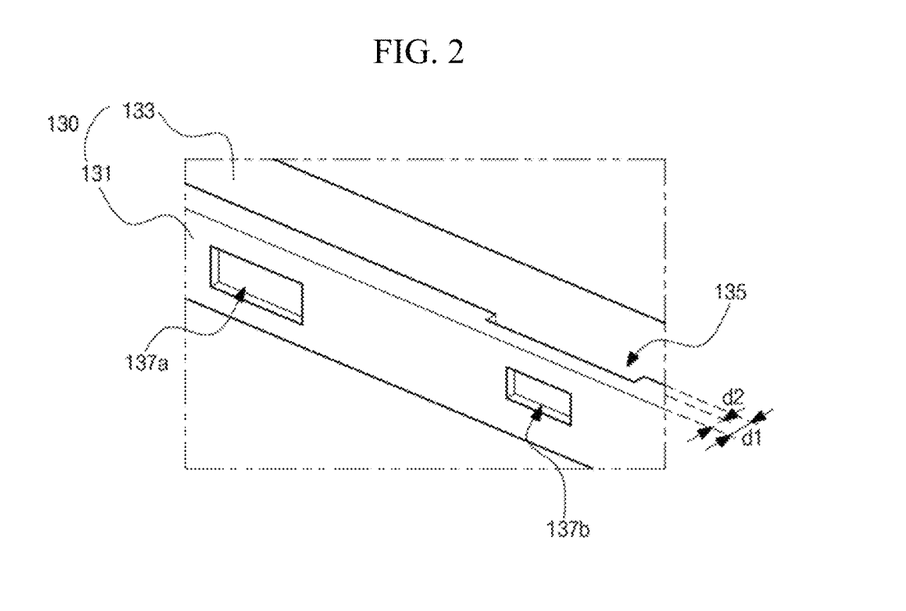
FIG. 2 is a perspective view showing a portion of a vertical part of a side frame in an LCD device according to the present disclosure from a rear side.

The vertical portion 131 of the main frame 130 has a first width "d1" (of FIG. 2). A part of the vertical portion 131 has a second width "d2" (of FIG. 2), which is smaller than the first width "d1", to form or define a fastening part 135. In other words, a groove (e.g., a fastening groove) is formed by a portion of the vertical portion 131 such that a width (or a thickness) is decreased, and the portion having the decreased width is defined as the fastening part 135.

A first fastening hole 137a is formed in the vertical portion 131 having the first width "d1", and a second fastening hole 137b is formed in the fastening part 135.

The main frame 130 is disposed on the bottom frame 150, and the bottom frame 150 includes a horizontal surface (e.g., a bottom surface) 151 where the backlight unit 120 is disposed. The liquid crystal panel 110, the backlight unit 120 and the main frame 130 are supported by the bottom frame 150, and the light loss in the LCD 100 is prevented or minimized by the bottom frame 150.

The bottom frame 150 includes the horizontal surface 151 and a side surface (e.g., a vertical surface) 153 upwardly bending from the horizontal surface 151 toward the liquid crystal panel 110.

A first fastening protrusion 157a, which is configured to be inserted into the first fastening hole 137a in the main frame 130, is formed at an outer side of the side surface 153, and a fixing part (e.g., a fixing protrusion or a fixing end) 155 is formed at a side of the first fastening protrusion 157a. Namely, the fixing part 155 is disposed between adjacent first fastening protrusions 157a and extending from the side surface 153 of the bottom frame 150 toward the liquid crystal panel 110.

A second fastening protrusion 157b, which is configured to be inserted into the second fastening hole 137b in the main frame 130, is formed at the fixing part 155.

The guide panel 130, which covers an edge of the liquid crystal panel 110 and a side of the backlight unit 120, and the bottom frame 150, which covers a rear side of the backlight unit 120, are combined for modularization.

The main frame 130 can be referred to as a support main, a main support or a mold frame, and the bottom frame 150 can be referred to as a bottom cover or a cover bottom.

In the LCD device 100 of the present disclosure, a top frame (e.g., a top cover or a case top) covering a front side edge of the liquid crystal panel 110 is omitted such that the weight and the thickness of the LCD device 100 can be reduced and the manufacturing process of the LCD device 100 can be simplified. In addition, the production cost of the LCD device 100 can be reduced.

Moreover, by omitting the top frame, a display area of the LCD device 100 is increased, and a bezel of the LCD device 100 is decreased. Accordingly, a narrow bezel structure LCD device can be provided.

Further, in the LCD device 100 of the present disclosure, a width of the main frame 130 is significantly decreased. The main frame of conventional LCD device has a width being over 1 mm, while the width "d1" or "d2" of the main frame 130 of the LCD device 100 has a range of about 0.3 to 0.8 mm.

In the LCD device 100 of the present disclosure, a thickness "t" (of FIG. 3A) of the bottom frame 150 is significantly decreased. The bottom frame of a conventional LCD device has a thickness being over 1.5 mm, while the thickness "t" of the bottom frame 150 of the LCD device 100 of the present disclosure has a range of about 0.5 to 0.7 mm.

Accordingly, the LCD device 100 of the present disclosure provides a narrow bezel structure, light weight and thin profile.

In the LCD device 100, although the width "d1" and "d2" of the main frame 130 and the thickness "t" of the bottom frame 150 are significantly decreased, the main frame 130 and the bottom frame 150 are stably or securely fixed (or combined). In addition, the movement of the optical sheet 121 can be sufficiently prevented, and the expansion margin of the optical sheet 121 can be sufficiently provided.

Namely, the first fastening protrusion 157a at the bottom frame 150 is configured to be inserted into the first fastening hole 137a at the main frame 130, and the second fastening protrusion 157b at the bottom frame 150 is configured to be inserted into the second fastening hole 137b at the main frame 130. As a result, the main frame 130 and the bottom frame 150 are stably or securely fixed.

Figure 3A:
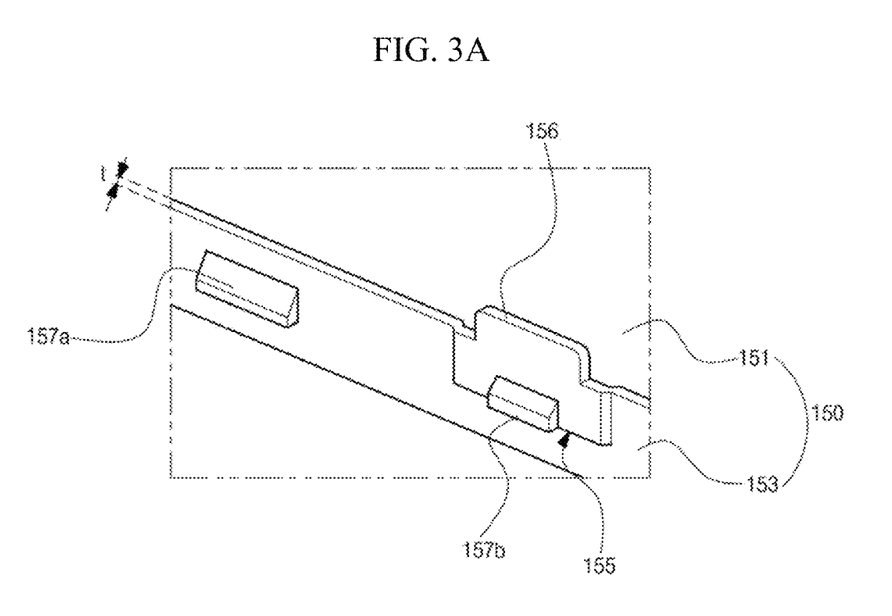
FIGS. 3A and 3B are perspective views respectively showing a portion of a side surface and a fixing part of a bottom frame in an LCD device according to the present disclosure.
Figure 3B:
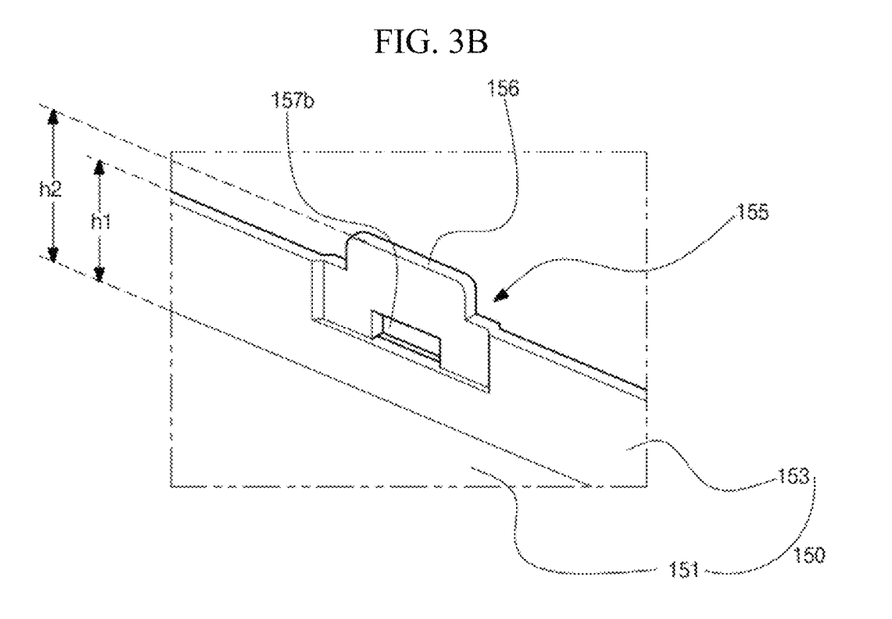

FIG. 2 is a perspective view showing a portion of a vertical part of a side frame in an LCD device according to the present disclosure from a rear side, and FIGS. 3A and 3B are perspective views respectively showing a portion of a side surface and a fixing part of a bottom frame in an LCD device according to the present disclosure. FIG. 3B shows an inner side of the fixing part in FIG. 3A.

As shown in FIG. 2, the main frame 130 is formed of a mold material. The main frame 130 includes the vertical portion 131 having a rectangular ring shape and the horizontal portion 133 inwardly protruding (or extending) from the vertical portion 131. The vertical portion 131 has a first width "d1", and a portion of the vertical portion 131 has a second width "d2" being smaller than the first width "d1". The portion having narrow width is defined as the fastening part 135.

The first fastening hole 137a is formed in the vertical portion 131 having the first width "d1", and the second fastening hole 137b is formed in the fastening part 135 having the second width "d2".

A combining groove 139 (of FIG. 5) is formed at a rear surface of the horizontal portion 133. The combining groove 139 corresponds to the fastening part 135.

The first width "d1" of the vertical portion 131 can have a range of about 0.7 to 0.8 mm, and the second width "d2" of the fastening part 135 can have a range of about 0.3 to 0.5 mm.

The first and second fastening holes 137a and 137b can have different shape and/or different size. The shape or the size of the first and second fastening holes 137a and 137b can be changed according to a shape or a size of the first and second fastening protrusions 157a and 157b of the bottom frame 150, which are respectively inserted into the first and second fastening holes 137a and 137b.

The first fastening hole 137a, which is formed at the vertical portion 131 with the first width "d1", can have a size being larger than the second fastening hole 137b, which is formed at the fastening part 135 with the second width "d2". In this case, the fastening strength between the main frame 130 and the bottom frame 150 can be improved.

Referring to FIG. 3A, the bottom frame 150 includes the horizontal surface 151 having a plate shape and the side surface 153 upwardly (e.g., vertically) bending from edges of the horizontal surface 151. The bottom frame 150 can be formed of a metallic material such as aluminum (Al), electrolytic galvanized iron (EGI), stainless steel (SUS), copper (CU) or magnesium (Mg).

The bottom frame 150 can be made of EGI having inexpensive cost and relatively excellent characteristics compared to aluminum.

Although the bottom frame 150 of EGI has a thickness "t" of about 0.5 to 0.6 mm, the bottom frame 150 has sufficient stiffness for stably supporting the backlight unit 120 and the liquid crystal panel 110.

The first fastening protrusion 157a is formed at an outer side of the side surface 153. Namely, the first fastening protrusion 157a protrudes from the side surface 153.

The first fastening protrusion 157a is formed by extrusion molding in a shape recessed from the inner side of the side surface 153 of the bottom frame 150.

The fixing part 155 is provided at a side of the first fastening protrusion 157a. As shown in FIG. 3B, a portion of the side surface 153 is recessed from the inside to the outside to from the fixing part 155, and the fixing part 155 upwardly extends to form a protrusion 156. Namely, the protrusion 156 protrudes from an upper surface of the fixing part 155.

Accordingly, the side surface 153 of the bottom frame 150 has a first height "h1", and the fixing part 155 including the protrusion 156 has a second height "h2" being greater than the first height "h1".

The first height "h1" of the side surface 153 can correspond to a thickness of the backlight unit 100 (of FIG. 1). For example, the first height "h1" of the side surface 153 can correspond to a thickness summation of the reflective sheet 125 (of FIG. 1) and the light guide plate 123 (of FIG. 1).

Namely, the first height "h1" of the side surface 153 can correspond to a height to cover an edge of the light guide plate 123.

The first and second fastening protrusions 157a and 157b can have different shape and/or different size. The first fastening protrusion 157a, which is formed at the side surface 153 of the bottom frame 150, can have a size being larger than the second fastening protrusion 157b, which is formed at the fixing part 155. In this case, the fastening strength between the main frame 130 and the bottom frame 150 can be improved.

In the modularization process of the bottom frame 150 and the main frame 130 with the liquid crystal panel 110 and the backlight unit 120, the first fastening protrusion 157a of the bottom frame 150 is configured to be inserted into the first fastening hole 137a of the main frame 130. In addition, in a state in which the fixing part 155 of the bottom frame 150 and the fastening part 135 of the main frame 130 are engaged with each other, the second fastening protrusion 157b provided on the fixing part 155 of the bottom frame 150 is configured to be inserted into the second fastening hole 137b at the fastening part 135 of the main frame 130.

Moreover, the protrusion 156 of the fixing part 155 in the bottom frame 150 is configured to be inserted into the combining groove 139 (of FIG. 5) at the horizontal portion 133 of the main frame 130.

Accordingly, the main frame 130 and the bottom frame 150 are assembled and fastened integrally with each other.

Figure 4:
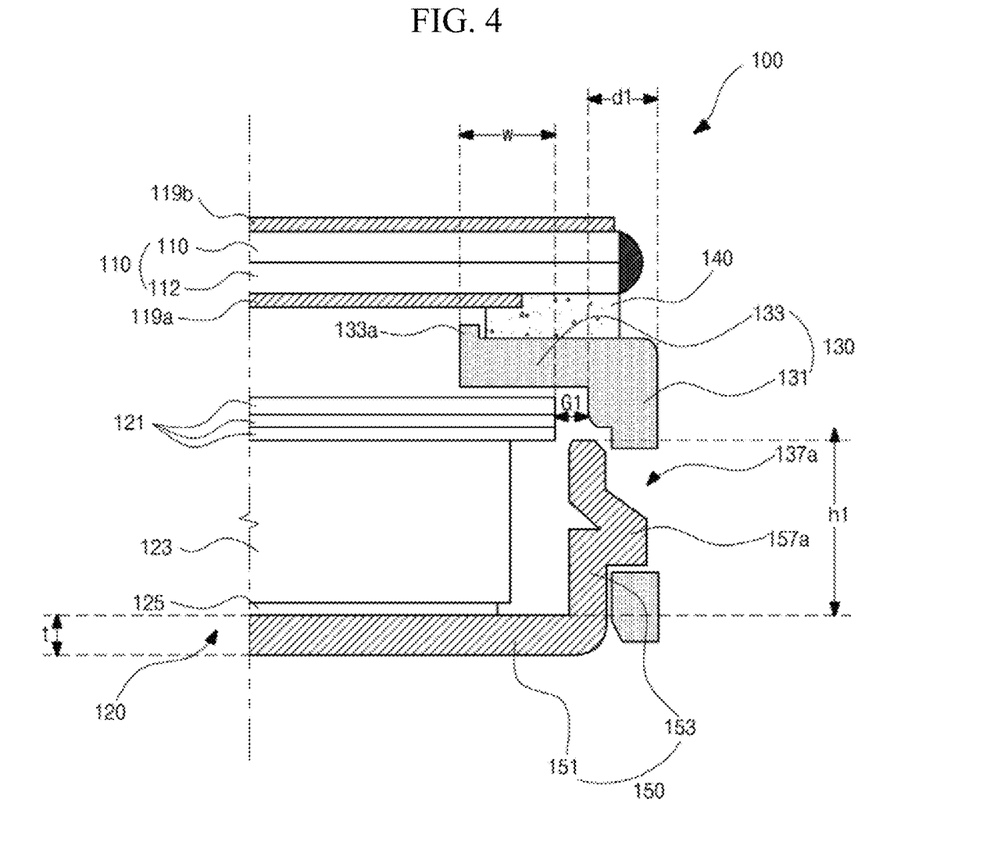
FIG. 4 is a cross-sectional view taken along the line IV-IV' in FIG. 1.
Figure 5:
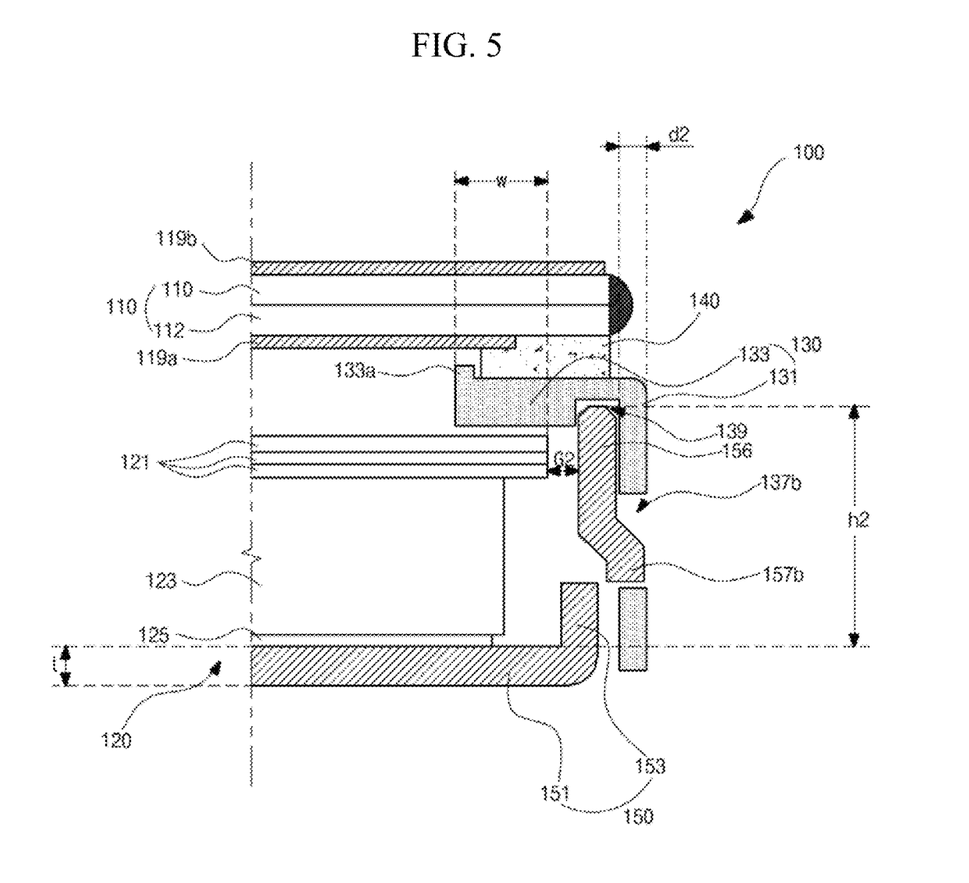
FIG. 5 is a cross-sectional view taken along the line V-V' in FIG. 1.

FIG. 4 is a cross-sectional view taken along the line IV-IV' in FIG. 1, and FIG. 5 is a cross-sectional view taken along the line V-V' in FIG. 1.

As shown in FIGS. 4 and 5, the backlight unit 120 includes the reflective sheet 125, the light guide plate 123, the LED assembly 129, which includes the LED 129a and the PCB 129b, and the optical sheet 121. The reflective sheet 125, the light guide plate 123 and the optical sheet 121 are sequentially stacked.

The liquid crystal panel 110 including the first and second substrates 112 and 114 and the liquid crystal layer therebetween is disposed over the backlight unit 120, and the first and second polarizing plates 119a and 119b for selectively transmitting light are positioned on outer sides of the first and second substrates 112 and 114.

The backlight unit 120 and the liquid crystal panel 110 are disposed on the horizontal surface 151 of the bottom frame 150, an outer surface of the side surface 153 of the bottom frame 150 is disposed to be close to an inner surface of the vertical portion 131 of the main frame 130.

A rear edge of the liquid crystal panel 110 is disposed on and fixed to the horizontal portion 133 using the foam pad 140 such as a double-sided tape.

A protruding end (e.g., a protruding part) 133a for guiding and/or fixing a position of the foam pad 140 can be further formed at an end of the horizontal portion 133 of the main frame 130.

Referring to FIG. 4, the first fastening protrusion 157a at the side surface 153 of the bottom frame 150 is configured to be inserted into the first fastening hole 137a of the main frame 130. Referring to FIG. 5, in a state in which the fastening part 135 of the main frame 130 and the fixing part 155 of the bottom frame 150 are engaged with each other, the second fastening protrusion 157b of the bottom frame 150 is configured to be inserted into the second fastening hole 137b of the main frame 130.

In addition, the protrusion 156 of the fixing part 155 in the bottom frame 150 is configured to be inserted into the combining groove 139 at a rear side of the horizontal portion 133 of the main frame 130. Accordingly, the main frame 130 and the bottom frame 150 are stably assembled and fastened with each other.

As mentioned above, in the LCD device 100 of the present disclosure, the thickness of the bottom frame 150 and the width of the main frame 130 are reduced such that the narrow bezel structure is provided. When the bezel in conventional LCD device is 6 mm, the bezel in the LCD device 100 of the present disclosure can be decreased into about 3.5 mm by reducing the thickness of the bottom frame 150 and the width of the main frame 130.

In addition, the horizontal portion 133 of the main frame 130 has a pre-determined length "w" such that the horizontal portion 133 of the main frame 130 can partially overlap the optical sheet 121. As a result, the movement of the optical sheet 121 can be prevented or minimized, and the degradation of the display quality by the movement of the optical sheet 121 can be also prevented or minimized.

Moreover, as the side surface 153 of the bottom frame 150 is formed to have a first height h1, an edge of the light guide plate 123 among the elements of the backlight unit 120 is only guided by the side surface 153 of the bottom frame 150. Therefore, the optical sheet 121 positioned above the light guide plate 123 have a first gap "G1" with the vertical portion 131 of the main frame 130.

Furthermore, as the fastening part 135 is formed at the main frame with reduced width "d2", a second gap "G2" corresponding to the first gap "G1" is formed between the bottom frame 150 and optical sheet 121.

The first and second gaps "G1" and "G2" are provided for the expansion margin of the optical sheet 121. When the optical sheet 121 is expanded by a heat from the backlight unit 120, the deformation of the optical sheet 121 by the heat can be prevented or minimized.

As a result, the degradation of the display quality by the deformation of the optical sheet 121 can be prevented or minimized, and the reliability of the LCD device 100 can be improved.

In addition, as described above, the liquid crystal display device 100 according to the present disclosure can provide a narrow bezel structure by reducing the thickness "t" of the bottom frame 150 and the widths "d1" and "d2" of the main frame 130, and the LCD device 100 is more stably modularized.

For example, in the case of reducing the width of the main frame in order to provide the liquid crystal display device having light weight, thin profile and narrow bezel, the main frame can be deviated by small external force. Accordingly, the LCD device may be unstably modularized.

However, in the LCD device 100 according to the present disclosure, the first fastening force is provided by the coupling of the first fastening protrusion 157a of the bottom frame 150 and the first fastening hole 137a of the main frame 130. In addition, the second fastening force is provided by the coupling of the second fastening protrusion 157b of the bottom frame 150 and the second fastening hole 137b of the main frame 130.

The width "d2" of the fastening part 135 of the main frame, in which the second fastening hole 137b is formed, is decreased to provide the first and second gaps "G1" and "G2" for the expansion margin of the optical sheet 121. In this case, the second fastening force by the second fastening protrusion 157b and the second fastening hole 137b can be smaller than the first fastening force by the first fastening protrusion 157a and the first fastening hole 137a. However, in the present disclosure, the protrusion 156 is formed at the fixing part 155 of the bottom frame 150, and the protrusion 156 is configured to be inserted into the combining groove 139 at the rear surface of the horizontal portion 133 of the main frame 130. As a result, a third fastening force is provided, and the main frame 130 and the bottom frame 150 can be securely or stably combined.

In this case, even if an external force is applied to the main frame 130, the main frame 130 and the bottom frame 150 are strongly combined such that the deviation or the movement of the main frame 130 can be prevented and the LCD device 100 can be stably modularized.

Figure 6A:
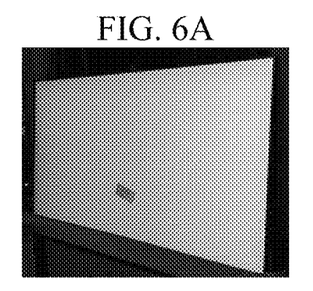
FIGS. 6A to 6C are photographs showing the reliability-testing results and the impact-test result of an LCD device according to the present disclosure.
Figure 6B:
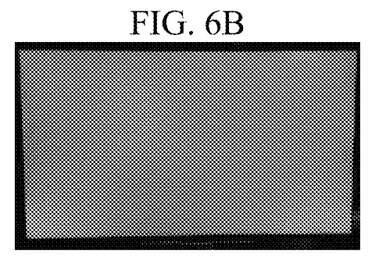
Figure 6C:
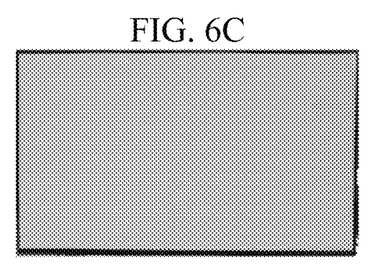

FIGS. 6A and 6B are photographs showing the reliability-testing results of an LCD device according to the present disclosure, and FIG. 6C is a photograph showing the impact-test result of an LCD device according to the present disclosure FIG. 6A is a result of testing whether wrinkles occur due to expansion of the optical sheet 121 (FIG. 5) or movement of the optical sheet 121. Even when the thickness "t" of the bottom frame 150 (of FIG. 5) and the widths "d1" and "d2" of the main frame 130 (of FIG. 5) are significantly reduced as the LCD device 100 of the present disclosure, the horizontal portion 133 (of FIG. 5) of the guide panel 130 and the optical sheet 121 are partially overlapped, so that the movement (or flow) of the optical sheet 121 does not occur. In addition, by forming the side surface 153 of the bottom frame 150 to have a first height "h1" (of FIG. 5) and reducing the width "d2" of the vertical portion 131 through the fastening part 135, the expansion margin, i.e., the first and second gaps "G1" and "G2", for the expansion of the optical sheet 121 is provided such that the wrinkle of the optical sheet 121 can be prevented.

FIG. 6B is a test result of whether light leakage occurs or not due to the movement of the optical sheet 121. As the result of the test, there is no movement of the optical sheet 121, and there is no light leakage in the LCD device 100.

In addition, referring to FIG. 6C, even if the impact test is performed on the LCD device 100 of the present disclosure, defects in the driving and assembly properties of the LCD device 100 are not generated.

As described above, in the LCD device 100 of the present disclosure, the thickness "t" of the bottom frame 150 and the widths "d1" and "d2" of the main frame 130 are significantly reduced, and the fastening part 135 and the fixing part 155 are respectively provided on the main frame 130 and the bottom frame 150. As a result, the LCD device 100 can be stably modularized with light weight, thin profile and a narrow bezel.

In addition, the optical sheet 121 partially overlaps the horizontal portion 133 of the main frame 130, and the expansion margin, i.e., the first and second gaps "G1" and "G2", for the optical sheet 121 is provided. Accordingly, the degradation of the display quality by the optical sheet 121 is sufficiently and effectively prevented.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:
1. A liquid crystal display device, comprising:
a liquid crystal panel;
a backlight unit disposed under the liquid crystal panel and including a light guide plate and an optical sheet over the light guide plate;

a bottom frame including a horizontal surface and a side surface; and a main frame surrounding a side of the liquid crystal panel and a side of the backlight unit, and including a vertical portion, wherein first and second fastening protrusions are provided at an outer surface of the side surface of the bottom frame, wherein the bottom frame further includes a fixing part protruding from the side surface of the bottom frame, wherein the bottom frame further includes a protrusion upwardly extending from an upper surface of the fixing part of the bottom frame, wherein the side surface of the bottom frame has a first height to cover an edge of the light guide plate, and wherein a first gap is provided between the optical sheet and the vertical portion of the main frame, and a second gap corresponding to the first gap is provided between the optical sheet and the protrusion of the bottom frame.

2. The liquid crystal display device according to claim 1, wherein the first and second fastening protrusions have different sizes from each other.

3. The liquid crystal display device according to claim 1, wherein the main frame further includes a horizontal portion, a first fastening hole and a second fastening hole, wherein the vertical portion of the main frame has a first width, and the liquid crystal panel is disposed on the horizontal portion of the main frame, and wherein the first fastening hole of the main frame is combined with the first fastening protrusion, and the second fastening hole of the main frame is combined with the second fastening protrusion.

4. The liquid crystal display device according to claim 3, wherein the main frame further includes a fastening part fastened with the fixing part and having a second width smaller than the first width of the vertical portion of the main frame.

5. The liquid crystal display device according to claim 1, wherein a portion of the side surface of the bottom frame is recessed from an inside to an outside from the fixing part of the bottom frame, wherein the second fastening protrusion is disposed at the fixing part of the bottom frame, and wherein the fixing part of the bottom frame is engaged with the fastening part of the main frame.

6. The liquid crystal display device according to claim 5, wherein the main frame further includes a combining groove at a rear surface of the horizontal portion of the main frame, and wherein the protrusion of the bottom frame is configured to be inserted into the combining groove of the main frame.

7. The liquid crystal display device according to claim 3, wherein the main frame further includes a protruding end at an end of the horizontal portion of the main frame.

8. The liquid crystal display device according to claim 1, wherein the backlight unit further includes:

a reflective sheet under the light guide plate; and a light emitting diode (LED) assembly at a side of the light guide plate.

9. A liquid crystal display device, comprising:

a liquid crystal panel;

a backlight unit disposed under the liquid crystal panel and including a light guide plate and an optical sheet over the light guide plate;

a bottom frame including a horizontal surface and a side surface, wherein first and second fastening protrusions are provided at an outer surface of the side surface of the bottom frame; and a main frame surrounding a side of the liquid crystal panel and a side of the backlight unit, and including a vertical portion, a horizontal portion, a first fastening hole and a second fastening hole, wherein the vertical portion of the main frame has a first width, and the liquid crystal panel is disposed on the horizontal portion of the main frame, wherein the first fastening hole of the main frame is combined with the first fastening protrusion, and the second fastening hole of the main frame is combined with the second fastening protrusion, wherein the bottom frame further includes a fixing part, and the main frame further includes a fastening part fastened with the fixing part and having a second width smaller than the first width of the vertical portion of the main frame, and wherein the inner surface of the vertical portion is recessed to have the second width and to form the fastening part.

10. The liquid crystal display device according to claim 9, wherein the first and second fastening protrusions have different sizes from each other.

11. The liquid crystal display device according to claim 9, wherein the second fastening hole has a size being smaller than the first fastening hole, and the fastening part is disposed to correspond go the second fastening hole.

12. The liquid crystal display device according to claim 9, wherein the main frame further includes a protruding end at an end of the horizontal portion of the main frame.

13. The liquid crystal display device according to claim 9, wherein the backlight unit further includes:

a reflective sheet under the light guide plate; and a light emitting diode (LED) assembly at a side of the light guide plate.

* * * * *